April 3, 1962  D. R. KERSTETTER ETAL  3,028,518
FRAME STRUCTURE FOR STRAP FRAME GRIDS
Filed Oct. 13, 1959
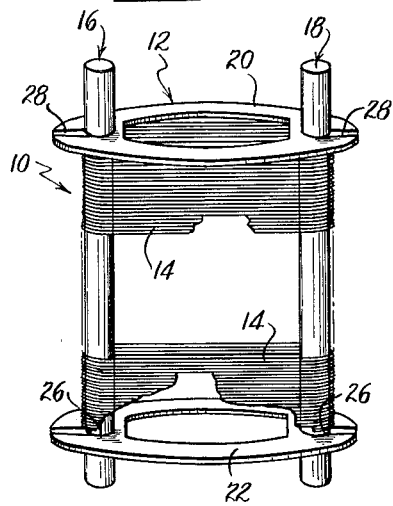
Fig. 1.
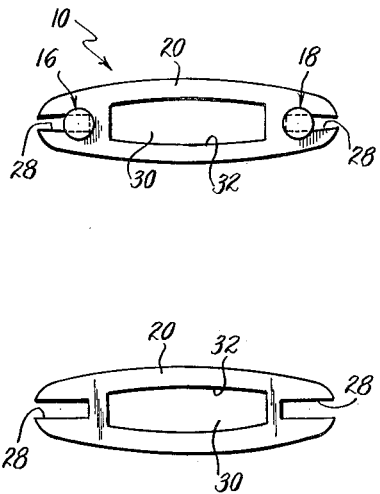
Fig. 2.
Fig. 3.
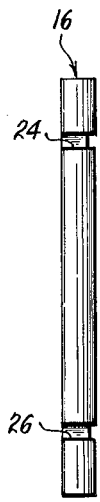
Fig. 4.
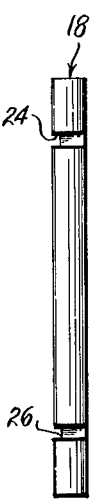
Fig. 5.
INVENTORS
Donald R. Kerstetter
Leonard D. Schwender
BY Michael Hertz
ATTORNEY United States Patent Office 3,028,518
Patented Apr. 3, 1962

3,028,518
FRAME STRUCTURE FOR STRAP FRAME GRIDS
Donald R. Kerstetter, Rich Valley, and Leonard D. Schwender, Emporium, Pa., assignors to Sylvania Electric Products Inc., a corporation of Delaware
Filed Oct. 13, 1959, Ser. No. 846,121
6 Claims. (Cl. 313—350)

This invention relates to frame grids, that is to say to grids for electron tubes wherein the grid wires, known as the grid laterals, are wound about a self supporting frame.

For some uses, as for example in high premium tubes, where stability, rigidness, and avoidance of secondary emission is particularly desired, the grids are made with rigid frames and these rigid frames or at least portions of them are made of molybdenum or like refractory metal. Such metals are hard to weld or even braze together and where frame grids are to be made in large quantities and at a rapid rate, welding and brazing methods are not suitable. Nor is metallic spraying or vaporizing suitable for the purpose of securing the parts together.

It is an object of the invention to provide a grid frame which shall adapt itself to rapidity of manufacture and yet obtain a rigid frame. It is also an object of the invention to provide a grid comprised of grid lateral wires and a grid frame which latter shall consist of parts which have been interfitted and squeezed together to form a unitary rigid structure. Other objects will become apparent after reading the following specification in association with the accompanying drawings in which:

FIG. 1 is a perspective view of a grid made in accordance with the invention.

FIG. 2 is a top plan view of the grid frame assembly after squeezing in of the ends of frame straps.

FIG. 3 is a plan view of a frame strap and

FIGS. 4 and 5 are respectively the right and left hand vertical side rods of the grid frame.

Referring to the drawings in greater detail, at 10 is indicated a frame grid comprised of a grid frame 12 and grid lateral wires 14, the grid lateral wires at the bottom of the frame in FIG. 1 being broken away.

The grid frame is comprised of a pair of lateral side rods 16 and 18 and upper and lower end plates 20 and 22. In the premium type of electron tube referred to above, the grid lateral wires are made of tungsten wound about the grid frame and secured to the side rods 16 and 18 by brazing, peening, electroplating or other conventional methods.

The end plates which are of a refractory metal, for example molybdenum, and the side rods which may or may not be refractory metal are metals difficult to weld together, while brazing is a time consuming task. In the case of the use of a refractory metal or refractory metals, in accordance with this invention, the parts are secured together by tight interfitting of elements coupled with subsequent squeezing of parts together to prevent separation of the tightly fitted parts.

In the illustrated embodiment of the invention, each of the side rods is provided with a pair of notches 24 and 26, as by having them swaged into the rods. Each of these notches extends around all but the back side of each side rod, as will be understood when viewing FIG. 2, to leave a rounded portion of the rod and three straight sides of a rectangle.

Each of the end plates is provided at its two ends with bifurcations leaving rectangular slots 28 of a size to cause the bifurcations to snugly fit about the notches in the side rods. After the plates have been assembled with the side rods, as shown in FIG. 2, the extreme end portions of the bifurcations are pressed together so that they almost come into contact, as shown in FIG. 1. Thus the frame parts are rigidly locked together. After the frame parts have been assembled, the grid wire is wound thereon and fastened to the side rods to form the completed frame grid.

The frame plates are centrally recessed, as indicated at 30 and the long walls 32 of the recesses are made elliptical in shape to conform with the finished elliptical contour of the grid lateral wires. By thus shaping the inner walls 32 of the openings, the frames are maintained spaced as much from the cathode as are the grid laterals and, therefore, the cathode-grid capacitance is less than in a structure wherein the walls 32 are straight.

Having thus described the invention, what is claimed as new is:

1. A grid frame comprised of two laterally spaced vertical, parallel side rods and two vertically spaced horizontal plates, each side rod having notches cut therein near the ends thereof and each plate having bifurcations at the ends of the plate forming slotted portions, each of said slotted portions of said lateral ends having its bifurcations snugly engaging a corresponding notch in the side rods, with the bifurcations of the ends of the plates extending beyond the rods, the free ends of the bifurcations being directed toward each other.

2. A frame grid structure for use in an electron tube comprising a grid frame and grid lateral wires surrounding the frame, said frame being comprised of a pair of parallel laterally spaced apart vertical side rods and a pair of vertically spaced parallel plates, each side rod having notch near each end of the rod, each plate having bifurcations at the ends of the plate forming slotted portions of a size to cause the bifurcations to snugly embrace the corresponding notch in the side rod with the inner end of each slot against the side rod at the notched portion thereof and with the ends of the bifurcations protruding beyond the side rod, the protruding ends of the bifurcations being directed toward each other to lock the plates and side rods together.

3. A frame grid structure for use in an electron tube comprising a grid frame and grid lateral wires surrounding the frame, said frame being comprised of a pair of parallel laterally spaced apart vertical side rods and a pair of vertically spaced parallel horizontal plates, the plates being of a refractory metal, each side rod having a notch near each end of the rod, each plate having bifurcations forming a slot at each of the lateral ends of the plate with the slot of a size to snugly embrace the corresponding notch in the side rod, with the inner end of each slot seated against and engaging the side rod at the notched portion thereof and with the bifurcations protruding beyond the side rod, the protruding ends of the bifurcations at each end of the ends of the plates being bent toward each other to lock the plates and side rods together.

4. A grid frame comprised of two laterally spaced vertical, parallel side rods and two spaced horizontal metal plates, each side rod having notches cut therein on opposite sides of the side rod and near each end thereof, and each plate having bifurcations at the ends of the plate forming slotted portions, each of said slotted portions of said plate having its bifurcations snugly engaging a corresponding notch in the side rods, with the bifurcations of the ends of the plates extending beyond the rods, the free ends of the bifurcations extending toward each other.

5. A frame grid structure for use in an electron tube comprising a grid frame and grid lateral wires surrounding the frame, said frame being comprised of a pair of parallel laterally spaced apart vertical side rods and a pair of vertically spaced metallic parallel plates, each side rod having opposed notches near each end of the rod, each plate having bifurcations at the ends of the plate forming slotted portions of a size to cause the bifurcations to snugly embrace the corresponding notches in the side rod with the inner end of each slot against the side rod at the notched portion thereof and with the ends of the bifurcations protruding beyond the side rod, the protruding ends of the bifurcations being directed toward each other to lock the plates and side rods together.

6. A grid frame comprised of two laterally spaced vertical, parallel circular side rods and two spaced horizontal metal plates, each side rod having notches cut therein on diametrically opposite sides of the side rod and near each end thereof, and each plate having bifurcations at the ends of the plate forming slotted portions, each of said slotted portions of said plate having its bifurcations snugly engaging a corresponding notch in the side rods, with the bifurcations of the ends of the plates extending beyond the rods, the free ends of the bifurcations extending toward each other.

References Cited in the file of this patent

UNITED STATES PATENTS

| | | |
|---|---|---|
| 1,570,265 | Lebbink | Jan. 19, 1926 |
| 2,347,262 | Herzog | Apr. 25, 1944 |
| 2,727,176 | Miller | Dec. 13, 1955 |
| 2,910,609 | Millis | Oct. 27, 1959 |
| 2,943,227 | Levin | June 28, 1960 |